US008537991B2

(12) United States Patent
McClure (10) Patent No.: US 8,537,991 B2
(45) Date of Patent: Sep. 17, 2013

(54) TOLL-FREE REVERSE LEAST COST ROUTING PRICE MANAGEMENT SYSTEM AND METHOD

(75) Inventor: Andrew L. McClure, Denver, CO (US)

(73) Assignee: Level 3 Communications, LLC, Broomfield, CO (US)

(*) Notice: Subject to any disclaimer, the term of this patent is extended or adjusted under 35 U.S.C. 154(b) by 25 days.

(21) Appl. No.: 13/272,578

(22) Filed: Oct. 13, 2011

(65) Prior Publication Data
US 2013/0094640 A1   Apr. 18, 2013

(51) Int. Cl.
*H04M 15/00*   (2006.01)
(52) U.S. Cl.
USPC ............... 379/114.02; 379/114.1; 379/115.02
(58) Field of Classification Search
USPC ............... 379/114.02, 114.03, 114.1, 114.12, 379/115.02
See application file for complete search history.

(56) References Cited

U.S. PATENT DOCUMENTS 6,005,926 A * 12/1999 Mashinsky ............... 379/114.02
6,167,124 A * 12/2000 Johnson et al. .......... 379/112.01
2003/0229613 A1 * 12/2003 Zargham et al. .................. 707/1

* cited by examiner

*Primary Examiner* — Quoc D Tran (57) ABSTRACT

The present disclosure describes systems and methods for performing reverse least cost routing and price management. In particular, a telecommunications carrier monitors network traffic for a wholesale carrier customer using the carrier's telecommunication services. A new pricing scheme and/or rate for network usage by the wholesale carrier may be generated based on a set of policies created by the carrier, such as when it is determined that the wholesale customer's network usage has decreased. The generated rates and/or pricing schemes may be provided to the wholesale carrier customer in real time.

18 Claims, 5 Drawing Sheets

TOLL-FREE REVERSE LEAST COST ROUTING PRICE MANAGEMENT SYSTEM AND METHOD

TECHNICAL FIELD

Aspects of the present disclosure relate to telecommunication systems, and in particular, to methods and systems for call routing, monitoring, and pricing.

BACKGROUND

Telecommunication carriers regularly enter into wholesale contractual agreements with other carriers to access all or part of the other carrier's telecommunication networks and/or telecommunication services. For example, a first telecommunication carrier may contract to use another carrier's network to complete toll-free telephone calls in geographical areas that the first telecommunication carrier does not service, or provide additional capacity on routes for which the first carrier may have limited capacity.

Traditionally, a carrier will charge a negotiated fee to route calls using the carrier's network and the rates are valid for some period of time. It is possible, however, for a telecommunication carrier to practice "least cost routing" to reduce telecommunication costs. Least cost routing involves using routing tables in conjunction with least cost routing software to compare rates charged by competing carriers, and making call routing decisions based on which carrier provides the lowest fee to use its network. Often, least cost routing occurs without notifying any of the carriers with higher rates. As a result, such carriers unknowingly lose network traffic and business to carriers with lower rates.

SUMMARY

One aspect of the present disclosure involves a method for performing reverse least cost routing rate management. The method includes identifying a change in network traffic on a telecommunication network by a carrier. The method also includes providing a rate, typically lower than an existing rate, for carrying traffic on the telecommunication network when the change is identified.

In another aspect, a system for performing reverse least cost routing rate management is provided. The system includes at least one processor and a memory in operable communication with the at least one processor. The system also includes a call rate application comprising modules executable by the processor. The modules include a networking monitoring module to identify a change in network traffic on a telecommunication network by a carrier. The modules also include a rate generation module to provide a rate for carrying traffic carry traffic on the telecommunication network when the change is identified.

In yet another aspect, a computer-readable medium encoded with a call rate application comprising modules executable by a processor is provided. The modules include a networking monitoring module to identify a change in network traffic usage on a telecommunication network by a carrier. The modules also include a rate generation module to generate a rate for carrying traffic on the telecommunication network when the change is identified.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The foregoing and other objects, features and advantages of the inventive concepts set forth herein will be apparent from the following description of particular embodiments of those inventive concepts, as illustrated in the accompanying drawings in which like reference characters refer to the same parts throughout the different views. The drawings are not necessarily to scale; emphasis instead being placed on illustrating the principles of the inventive concepts.

DETAILED DESCRIPTION

The present disclosure describes systems and methods for performing reverse least cost routing price management. In various implementations, network traffic of a telecommunications carrier is monitored to identify changes in such network traffic which may be caused by least cost routing of toll-free calls by wholesale carriers. Stated differently, the wholesale carrier may have existing contracts with several carriers and through least cost routing ("LCR") will route traffic to a lower cost carrier causing traffic to decrease for the other, higher cost carriers. When a change in network traffic is identified, such as a decrease in traffic for toll-free-calls, the systems and methods discussed herein generate a new, more competitive rate, and provide it to the wholesale carrier. The system then continues to monitor traffic from the wholesale carrier to determine if network traffic volume stabilizes or increases. Network traffic for a wholesale carrier is considered to have stabilized when network traffic stops decreasing changes in network traffic align with historic call volumes, or when network traffic for a wholesale carrier says substantially the same for a period of time, such as a minute, hour, day, week, month, etc., relative to another period of time. It is contemplated that any temporal period or user-defined temporal period may be used to indicate when network traffic stabilizes. Moreover, it is contemplated that traffic volume stability may be determined based on a comparison with historical traffic volume data for the same or a similar relative period, may be based on a continuous average and identification of traffic volume trends, and other traffic volume comparisons.

When a change in network traffic is detected, the system determines the carrier for the number associated with the decrease. For example, if traffic volume for a particular toll-free number was previously at 100 calls per minute for a particular day and time, and had decreased to 10 calls per minute for the same day and time, the system would trigger a call route setup to the public switched telephone network to determine the current carrier for the toll-free number. In the event that the carrier had changed, the system would then trigger a rate adjustment provided non-LCR factors (e.g., a holiday, network problems, etc.) did not account for the reduced network traffic. The rate adjustment may be to a new rate determined by some percentage of the current rate, may be preset in the system on a carrier-by-carrier basis, may be set incremental increases or decreases, or some other basis for the rate change. Should call volume return to about 100 calls per minute with the new rate, the system would consider the network traffic to have stabilized.

Alternatively, if the system is continuously tracking call volume for a particular toll-free wholesale carrier and identifies a decrease in volume over time (e.g., 100 calls per minute average, 9:00-9:10 AM; 90 calls per minute average, 9:10-9:20 AM, 80 call per minute average, 9:20-9:30 AM) that is likely a result of traffic loss due to LCR rather than some other factor (time of day, network problems, etc.), the system may trigger the methods discussed herein that result in a rate adjustment. The system can be tuned such that a range of volumes would be considered stable, such as +/−10% from historical traffic data. In such a scenario, call volume for the same relative period of 90-110 calls per minute would be considered stable or volume that is steady between 90-110 calls per minute average. Call volume outside this range may or may not trigger additional rate adjustments. Thus, with the systems and methods discussed herein, a given carrier may automatically optimize its rate structure with a wholesale carrier (or other carrier) to optimize network traffic volume and revenues.

Toll-free telephone calls allow callers to reach businesses and/or individuals without being charged for the call. Instead, the charge for using the toll-free telephone number is paid by the party associated with the toll-free number (the called party), known as the toll-free subscriber. In order to transmit the toll-free call from the caller to the called party, the toll-free call may be routed through one or more telecommunication networks. A telecommunication network is a collection of terminals, switches, nodes, control units, and/or other technological components, both hardware and software, necessary to enable telecommunication between users of the terminals.

In some instances, to determine through which network to route, the party responsible for routing the toll-free call will practice LCR to find the lowest rate. LCR involves a process of analyzing, selecting, and directing the route of outbound communications traffic based on which path provides the lowest cost or a relatively lower cost compared to other paths. A telecommunications carrier responsible for originating a toll-free telephone call, may periodically (monthly, weekly or even daily) use LCR to choose between several different carrier networks to route calls. The LCR function may be automated by a device or software program. Besides costs, other factors such as reliability, hops, available bandwidth, etc., may also be considered when performing LCR and routing calls.

Figure 1:
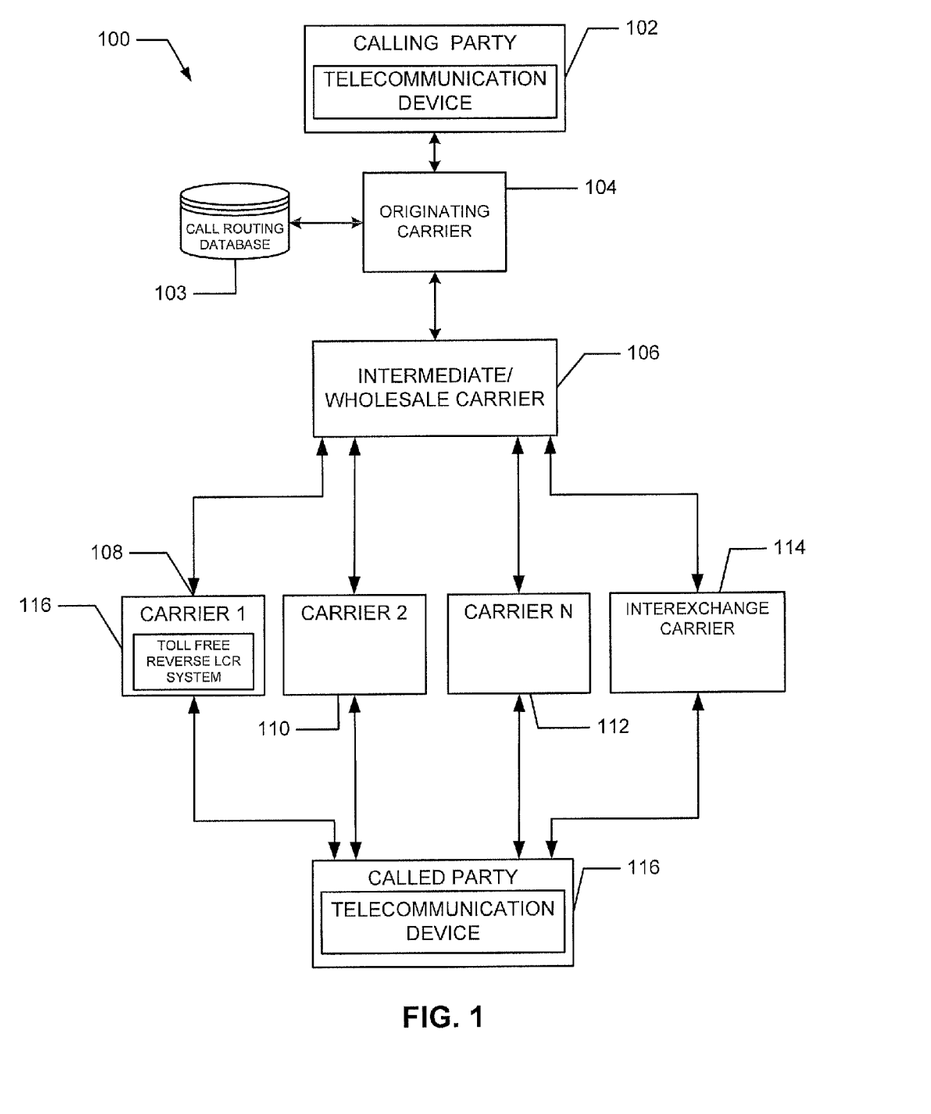
FIG. 1 is a block diagram illustrating an example operating environment for performing reverse least cost routing price management, in accordance with an embodiment of the present disclosure.

FIG. 1 is a diagram depicting the carrier relationships involved in routing toll-free calls based on LCR as well as reverse LCR in accordance with aspects of the present disclosure. To begin, a caller dials a toll-free number from a telecommunication device 102. The telecommunication device 102 may be a conventional telephone, mobile phone, cellular phone, satellite phone, computer, processing device, or any other device capable of dialing toll-free numbers. The telecommunication device 102 may also be a voice over internet protocol ("VOIP") device, VOIP telephone, VOIP adapter, VOIP system, and/or any other technology or combination of technologies capable of providing VOIP communications. Generally, VOIP is an internet-based communications protocol that allows for telephonic communication using the Internet, by converting speech into digital data.

When a user initiates a toll-free call using some form of telecommunication device 102, the toll-free call may be set up and routed through a number of networks. For example, the toll-free call may be routed through a public switched telephone network ("PSTN"), a Signaling System #7 network ("SS7") and/or an originating carrier 104, such as a local exchange carrier ("LEO"), competing local exchange carrier ("CLEC"), or some combination thereof. The originating carrier 104 is responsible for originating the call from the telecommunication device 102 and determining where the toll-free call is to be terminated. In one aspect, the originating carrier 104 may use a standardized call routing database 103, such as the SMS800 Database™ or the LERG™ database, to determine where the toll-free call is to be terminated.

The originating carrier 104 may have to route the toll-free call through one or more intermediate networks, such as a wholesale carrier network 106, in order to properly route the toll-free call. A wholesale carrier is often a licensed company, such as a telecommunications network operator, that provides network services to retail communications service providers such as toll-free service providers. In contrast, the retail telecommunication service providers are responsible for providing telephone services to subscribers.

The wholesale carrier 106 may contract with a variety of additional carriers 108, 110, and 112 to pay a particular rate for access to the carriers' telecommunication networks and/or telecommunication services. According to one aspect, the wholesale carrier 106, may contract with the carriers 108, 110, and 112 for termination services of toll-free calls. "Call termination," refers to the routing of telephone calls from a carrier to a terminating carrier, and the service whereby a call is "terminated" to one of the subscribers of the terminating carrier's network by a caller on another network. The terminating point is the called party or end point of the call.

Thus, a retail carrier typically has contracts with individuals and organizations placing calls and a wholesale carrier has contracts with the retail carriers to handle the call traffic. Often, however, wholesale carriers also act as retail carriers and retail carriers also act as wholesale carriers depending on the circumstances. Moreover, routing and eventually terminating the call, particularly if the call is long distance, will often involve additional carriers. Thus, the terms "retail carrier" and "wholesale carrier" are merely used herein as a convention to provide context to the present disclosure recognizing the various carriers, whether retail, wholesale, or otherwise, may use or otherwise employ aspects of the present disclosure.

To determine how to route the toll-free call, the wholesale carrier 106 may perform LCR to determine the lowest cost routes. For example, the wholesale carrier 106 may negotiate and contract at a first rate with the first carrier 108 to route toll-free calls (e.g., terminate calls). At a later time, the wholesale carrier 106 may negotiate and contract with the second carrier 110 at a second rate that is lower than the first rate. As another example, if the toll-free call is long distance, the wholesale carrier 106 may contract with interexchange carrier 112 to route long distance calls. An interexchange carrier is a particular type of carrier used for long distance calling. An interexchange carrier may be able to directly terminate a call to a called party telecommunication device 118, or the interexchange carrier 112 may have to route the call to additional carriers and networks before the toll-free call can be terminated. The wholesale carrier 106 compensates all of the carriers it uses for telecommunication services based on a negotiated rate. There may be hundreds of carriers (and interexchange carriers) that the wholesale carrier 106 may use when determining how to complete a toll-free call.

Thus, to route calls, and in particular toll-free calls, the wholesale carrier 106 may use LCR to select amongst carriers to obtain the lowest cost for their telecommunication services. Typically, LCR occurs, without notifying the various affected carriers. Once the call has been properly routed, it is terminated to the called party telecommunication device 116. Carriers are constantly competing to offer lower rates to provide telecommunication services to the wholesale carrier 106. Since changes occur without the high cost carrier being aware, such carriers unknowingly lose network traffic and business to lower fee carriers.

Aspects of the present disclosure extend to methods and systems for carriers to perform reverse LCR and price management. In various implementations, one or more telecommunication carriers (e.g., carrier 1) may include a module, software application, and/or toll-free reverse LCR system ("TFRLS") 116 that monitors network traffic usage for a wholesale carrier. When the system identifies a change in network traffic, routing data is analyzed to determine the rates currently offered to the wholesale carrier and to generate a new rate for access to the telecommunication carrier's network. While aspects of the present disclosure are described from the perspective of a wholesale carrier relationship with other carriers, the methods and systems set forth herein are equally applicable to other carrier-to-carrier relationships involving LCR. For example, the systems and method described herein may apply to an originating carrier and wholesale carrier relationship where LCR is practiced. Similarly, the systems and methods described herein may apply to long distance carriers and wholesale carrier relationships that use LCR. It is contemplated that the methods and systems described herein may be applied to any carrier-to-carrier relationships where LCR is used.

Figure 2:
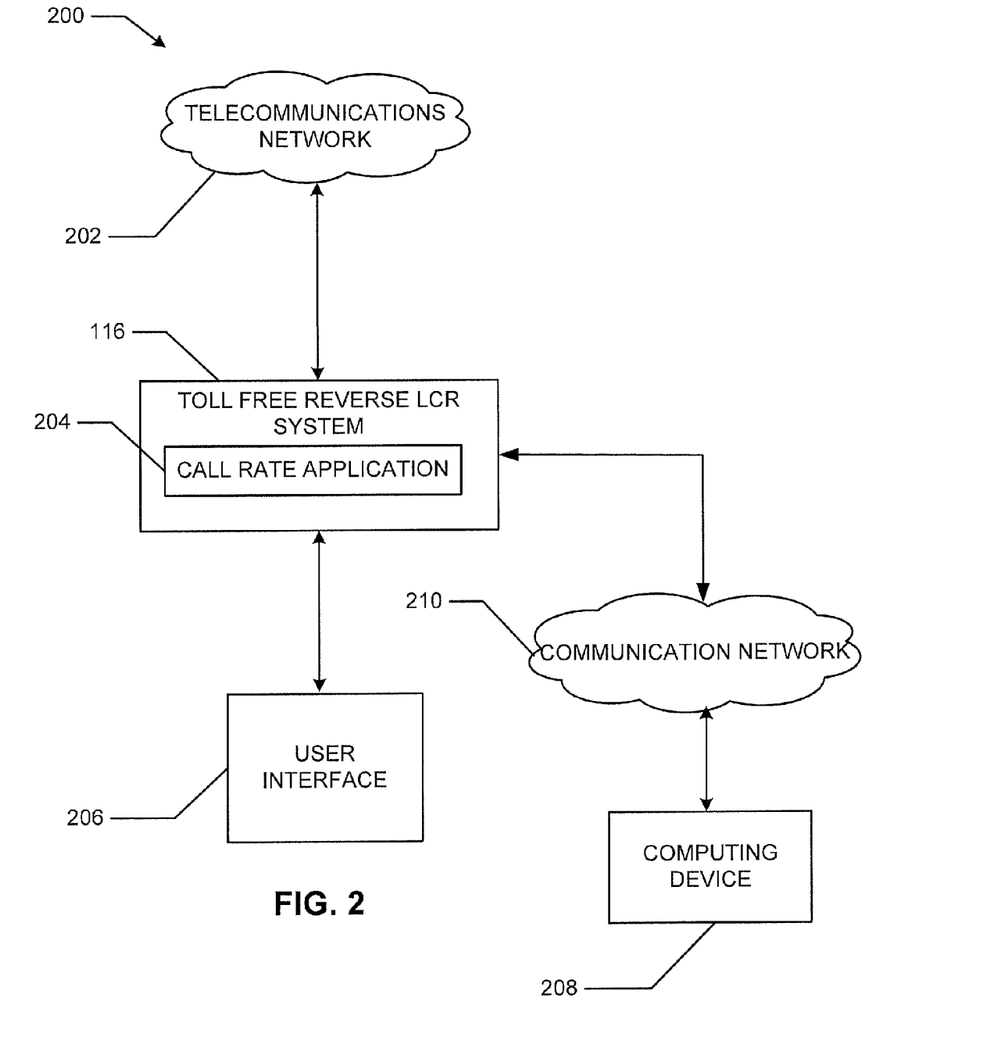
FIG. 2 is another block diagram illustrating an example computing environment for performing toll-free reverse lowest cost routing price management, in accordance with an embodiment of the present disclosure.

FIG. 2 illustrates an example of a computing environment 200 that may be implemented by a telecommunication carrier for performing toll-free reverse least cost routing and price management according to one aspect of the present disclosure. The TFRLS 116 executes a call rate application 204 that monitors the network traffic of a wholesale carrier using a telecommunication network 202. When changes in network traffic by the wholesale carrier suggest that the wholesale carrier may be directing traffic to another carrier due to LCR or otherwise, the TFRLS 116 generates a new rate for routing and/or terminating toll-free calls for the wholesale carrier. For example, the call rate application 204 receives routing data to identify the carrier currently routing toll-free calls for the monitored wholesale carrier. When the identified carrier is different from the carrier executing the reverse LCR application, the call rate application 204 generates a new lower rate for routing and/or terminating toll-free calls and provides the rate to the monitored wholesale carrier.

A user-interface (UI) 206 may be coupled to the TFRLS 116, such that a carrier administrator or other user may view and generate reports of the monitored traffic data, such as trend reports, actual volume reports, historic data reports, etc. Through the UI 206 the user may also access rates and/or fees, interact with the TFRLS 116 to provide rate adjustments when network traffic changes, and to determine whether such adjustments are effective in changing traffic. The UI 206 may include a display (not shown) such as a computer monitor, for viewing data and/or input forms, and an input device (not shown), such as a keyboard or a pointing device (e.g., a mouse, trackball, pen, or touch pad), for entering data into the TFRLS 116 and/or otherwise interacting with the TFRLS 116.

According to one aspect, the carrier administrator may use a computing device 208 to access and execute the TFRLS 116 for the purpose of generating and viewing reports of monitored network traffic usage on the telecommunication network 220 by wholesale carriers. The reports may automatically identify decreases in network traffic attributable to LCR such as through color coding, alarms, email, triggers, set points and the like. Moreover, the system may also provide a suggested new price rate for the administrator to offer the carrier in order to perform aspects of the reverse least cost routing. Computing device 208 may be a computer, a processing device, a communication device, or the like, such as a personal computer, a server computer, a tablet computer, a mobile processing device, a mobile communication device and/or the like. The computing device includes one or more processors that process software or other machine-readable instructions and includes a memory to store the software or other machine-readable instructions and data. The memory may include volatile and/or non-volatile memory. The computing device may also include a communication system to communicate via a wireline and/or wireless communications, such as through the Internet, an intranet, and Ethernet network, a wireline network, a wireless network, and/or another communication network. The computing device may further include a display (not shown) for viewing data, such as a computer monitor, and an input device (not shown), such as a keyboard or a pointing device (e.g., a mouse, trackball, pen, touch pad, or other device) for entering data and navigating through data, including exams, images, documents, structured data, unstructured data, HTML pages, other web pages, and other data.

The computing device 208 communicates with the TFRLS 116 via a communication network 210. The communication network 210 can be the Internet, an intranet, a local area network, a wireless local network, or another communication network, as well as combinations of networks. In another aspect, the computing device 208 may be coupled or communicatively connected to the TFRLS 116 from a remote location, such as by a wide area network or via the Internet. For example computing device 208 may communicate with the TFRLS 116 through a private network to perform toll-free reverse LCR price management. In another aspect, the computing devices 204, 206, and 208 may communicate with the TFRLS 116 directly such as through an Ethernet connection.

Figure 3:
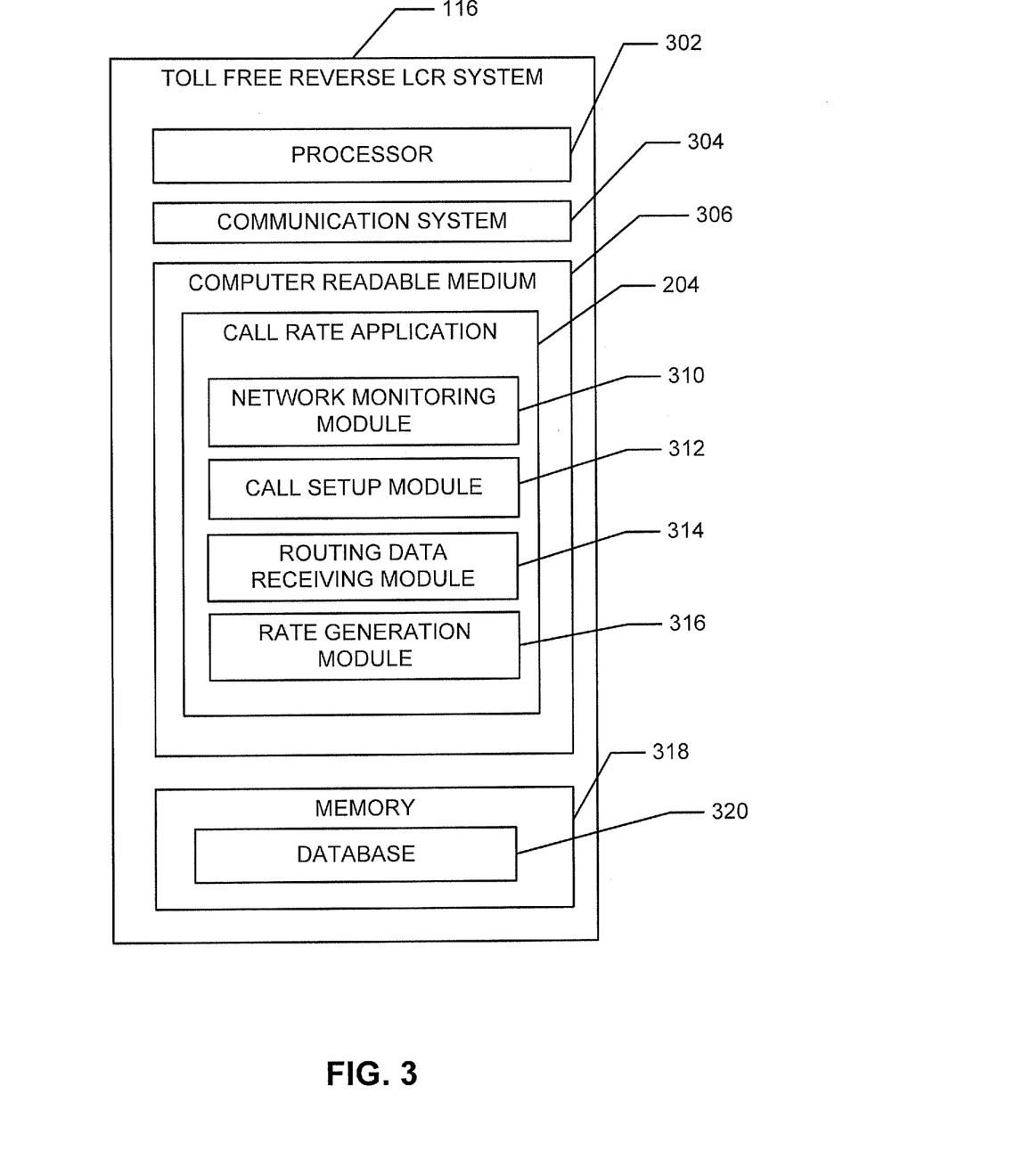
FIG. 3 is a block diagram illustrating a call rate application, in accordance with an embodiment of the present disclosure.

FIG. 3 is a block diagram that depicts the TFRLS 116 that may be used to execute the call rate application 204 (FIG. 2). The TFRLS 116 includes a processor 302 that may be used to execute the call rate application 204 to perform toll-free reverse LCR and price management. The processor 302 may include memory as well as other computing components.

According to one aspect, the TFRLS 116 includes a communication system 304 to communicate to provide communicative connectivity with the telecommunication network 202 that the TFRLS 116 monitors. For example, the communication system 304 may communicate with the telecommunication network 120 via wireline and/or wireless communications, such as through the Internet, an intranet, and Ethernet network, a wireline network, a wireless network, and/or another communication network.

According to another aspect, the TFRLS 116 includes a memory 318. The memory 318 may include volatile and/or non-volatile memory and may provide a database 320 to store routing data and wholesale carrier customer records. Wholesale carrier customer records include wholesale carrier data that identifies all of the current wholesale customers for a carrier. For example, wholesale carrier data may include a wholesale carrier name/entity and the current negotiated rate for carrying traffic and/or offering telecommunication services to that particular wholesale carrier. The database 320 may be a general repository of data including but not limited to routing data and wholesale carrier data. Besides memory, the database 320 may include memory and one or more processors or processing systems to receive, process, query and transmit communications and store and retrieve data. In another aspect, the database 320 may be a database server.

The TFRLS 116 may also include a computer readable media ("CRM") 306 storing executable instructions to implement the call rate application 204. The CRM 306 may include computer storage media, communication media, and/or another available medium that can be accessed by the processor 302. By way of example and not limitation, computer storage media includes memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

Generally, program modules include routines, programs, objects, components, data structures, etc., that perform particular tasks or implement particular abstract data types. For example, in one embodiment, the call rate application 204 includes a network monitoring module 310, a call setup module 312, a routing data retrieval module 314, and a rate generation module 316 that may be used to perform toll-free reverse least cost routing and price management. It is contemplated that other modules may also be included.

The network monitoring module 310 monitors traffic usage on the telecommunication network 202 for an identified wholesale carrier. To enable monitoring of the network traffic for the identified wholesale carrier the network monitoring module 310 first associates the TFRLS 116 with the telecommunications network 202. For example, the TFRLS 116 may be placed in communicative contact with the devices on the telecommunication network 202. Once connected to the telecommunications network 202, the network monitoring module 310 monitors network behavior for an identified wholesale carrier.

According to one aspect, the network monitoring module 310 monitors any change in network traffic usage by the identified wholesale carrier. For example, the network monitoring module 310 may monitor network traffic on the telecommunications network 202 and identify a decrease in network traffic by the identified wholesale carrier. Such a decrease may suggest that the rate currently being charged to the wholesale carrier is too high, since the wholesale carrier is routing less traffic through the network. In one embodiment, the network monitoring module 310 may identify a decrease when the network usage drops below a threshold. Alternatively, the network monitoring module 310 may monitor network traffic and identify an increase in network traffic by the identified wholesale carrier. Such an increase in traffic may suggest that the rate currently being charged to the identified wholesale carrier is low, since the identified wholesale carrier is routing more traffic through the network. In one embodiment, the network monitoring module 310 may identify an increase when the network usage rises above a threshold. It is contemplated that other types of changes in network traffic for a wholesale carrier may be identified by the networking module 310.

According to another aspect, the network monitoring module 310 may monitor the specific routes used by the wholesale carrier to route toll-free calls on the telecommunications network 202. For example, the network monitoring module 310 may monitor the specific switches and nodes through which calls serviced by the identified wholesale carrier are routed. It is contemplated that any type of network activity and traffic performed by the identified wholesale carrier may be monitored and qualified as a change in network traffic. Network activity ascertained during monitoring, such as the identification of a decrease in network traffic may be logged and/or stored in the database 318. Accordingly, the TFRLS 116 may identify traffic changes in real-time, analyze traffic at different times, compare traffic, identify traffic trends, etc. With such data and analysis, the TFRLS 116 may generate a new rate for wholesale carriers accessing the telecommunications network 202.

Figure 5:
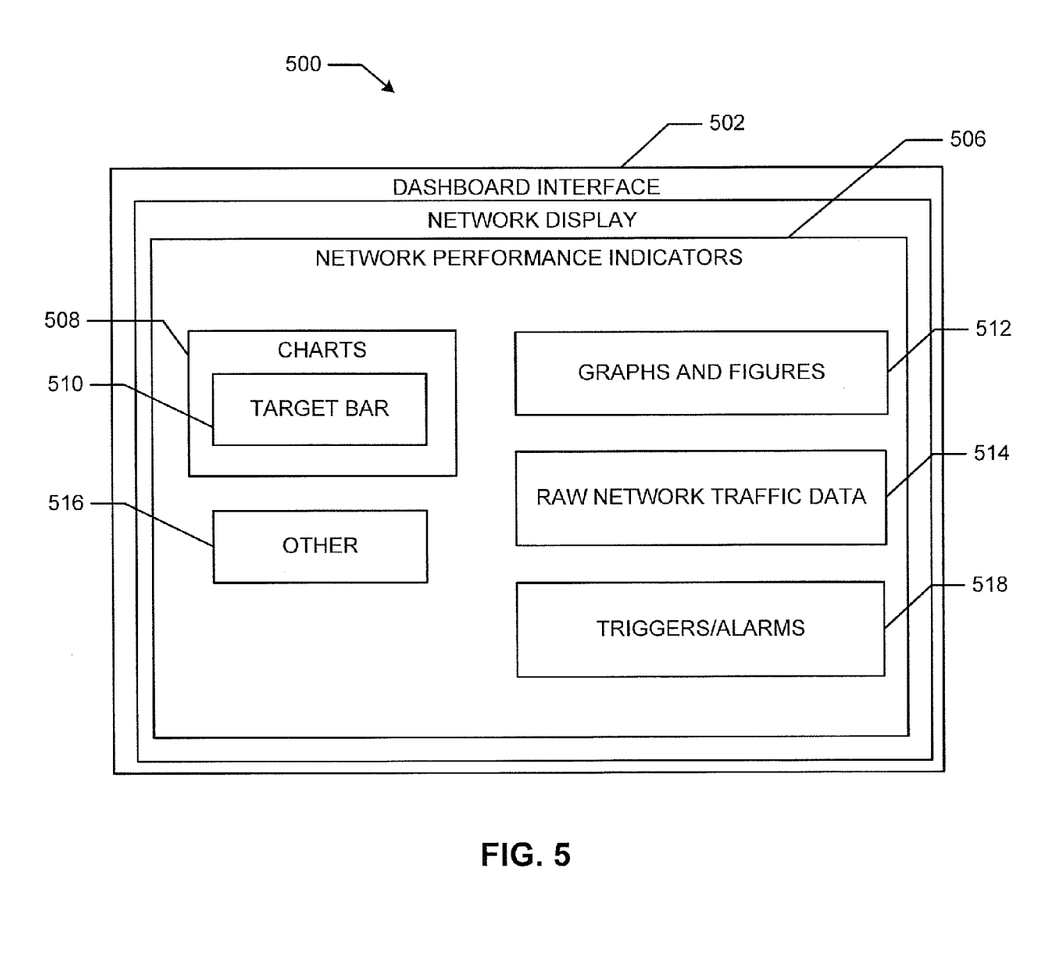
FIG. 5 is a block diagram illustrating an example dashboard for monitoring network traffic to perform least cost routing price management, in accordance with an embodiment of the present disclosure.

FIG. 5 is an example dashboard system 500 that may be provided by the networking module 310. According to one aspect, the networking module 310 may provide a dashboard system 500 including a dashboard interface 502 (e.g. a graphical user interface) that collects, manages, and presents the network activity data, network data, and/or network traffic data monitored and used by the networking module 310 to identify changes in network traffic. For example, the dashboard interface 502 may monitor all of the customers currently using a particular carrier's telecommunication network to route calls, such as toll-free calls.

The dashboard interface 502 may be configured to integrate network traffic data with network performance indicators 506 to provide an overview of the current network traffic usage on the telecommunication network 202. For example, dashboard interface 502 may include data charts, such as charts 508 to display network traffic usage. The charts 508 may further include the use of indicator tools, such as a target bar 510, as an input for analyzing and/or monitoring network traffic and identifying network traffic changes. The dashboard interface 502 may also include other network performance indicators 506 such as graphs and figures 512, raw network traffic data 514, other network traffic information and/or data 516, and alarms/triggers 518. For example, a carrier administrator may setup a network usage threshold trigger for a specific customer using the dashboard that indicates a new rate should be generated when the specific customer's network traffic decreases below the established threshold trigger.

Once a change in network traffic is identified by the network monitoring module 310, the call setup module 312 automatically performs the call set up as originating from the PSTN to a number associated with the identified wholesale carrier to identify data related to how the identified wholesale carrier is currently routing calls. In particular, the call setup module 312 establishes and/or sets up a call to a variable number, a toll-free number, or a location specific toll-free number that the wholesale carrier, identified as having a change in network traffic by the network monitoring module 310, is routing using other carrier networks. A typical call setup procedure is accomplished by the initiator of the telephone call entering a desired number to be called and a telephone switch arranging for a connection from the calling telecommunication device to the called telecommunication device. According to one aspect, the call setup module 312 uses a toll-free number associated with the wholesale carrier whose traffic usage has changed, as identified by the network monitoring module 310. The call setup module 312 initiates a toll-free call sufficient to return carrier information but does not necessarily complete the call.

The routing data receiving module 314 receives routing data based on call setup information provided by the call setup module 312. In one aspect, routing data refers to any information identifying how a call has been routed until the call terminates, and may indicate when and where the traffic is being lost, how much traffic is being lost, and to whom the traffic is being lost. For example, routing data may include data identifying an originating carrier, wholesale carrier, terminating carrier, or any other carrier used to route the call, a current rate at which calls are being routed, the duration of the call, etc. In one aspect, any routing data required to route the call from setup until termination may be included and considered routing data.

In yet another aspect, a call detail record may be received by the routing data receiving module 314 as a form of routing data. A call detail record ("CDR") (also known as a call data record) is a record produced by a carrier that contains the details of the call that was routed. The CDR may include routing data such as: the calling number (calling party); the receiving number (called party); the call start time (date and time); the call duration; the phone number charged for the call; the rate at which the call was routed; additional digits associated with the called number used to route or charge the call; the result of the call (whether it was answered, busy etc); the route by which the call entered the carrier; and, the route by which the call left. Other routing data may also be included. For example, the rate generation module 314 may receive a CDR identifying a wholesale carrier requiring call routing, the current LEO and/or interexchange carrier responsible for routing the call, and the rate at which all calls will be routed over the identified LEO and/or interexchange carrier's network.

The rate generation module 316 uses the routing data received by the routing data receiving module 314 to generate a new rate to offer or otherwise publish to the wholesale carrier when certain conditions are met. According to one aspect, the rate generation module 316 may query the database 318 to determine whether the wholesale carrier identified in the routing data received by the receiving module 314 is an existing wholesale carrier customer currently paying to route calls using the telecommunication network 202. When the wholesale carrier is an existing wholesale customer, the rate generation module 316 may use the current rate charged to the wholesale carrier to generate a new, more competitive rate.

For example, assume that company A has identified a change in traffic usage on its network by carrier B ("B"), a wholesale carrier, when routing toll-free calls using company A's network. The change, a traffic decrease, is due to B having performed LCR and using carrier C ("C") in place of company A to route toll-free calls. Further, assume company A is currently charging B $0.07 to route calls using company A's network. C, a wholesale carrier, is currently using company A's telecommunication network to route any toll-free calls it services. C must pay company A to use company A's telecommunication network to route B's calls. Accordingly, C is considered an existing customer of company A.

Currently, C is charging carrier B $0.06 to service any toll-free calls, and paying a rate of $0.05 to company A to route calls through company A's network, as indicated in the routing data received by the routing data receiving module 314. Thus, C earns a fee of $0.01 by routing B's toll-free calls. The rate currently paid by C to company A for access to the telecommunication network is based on previous contract negotiations. Further, C must use company A's network to route B's toll-free calls, because C does not have its own network capable of routing the calls, and/or there is no other network that C may use to route the calls to the proper terminating carrier. Company A may use the current $0.06 rate charged to B and the $0.05 rate that C is paying company A, to generate a more competitive rate between $0.051-$0.059 to offer to B. Company A may offer B a new rate of $0.059, which is lower than the rate B is currently paying C to route B's calls. Offering B $0.059 may result in an increase in network traffic by B to route calls using company A's telecommunication network since B would being paying $0.01 less to route calls using company A directly, instead of using C. Alternatively, if company A wanted to take all of the routing business generated by C when routing B's toll-free calls, company A may offer B a new rate of $0.051. A rate of $0.051 offers carrier B a new lower rate and ensures that C can no longer afford to route calls for B using company A's network. If C were to charge B less than $0:051 then it would no longer make a profit after paying company A $0.050 to route the toll-free calls. While company A will no longer receive business from C to route B's calls at $0.050, company A will gain network traffic from B to route B's calls at $0.051, which results in a $0.01 increase in profits over what company A was originally making from C when C routed B's calls. B is willing to pay $0.051 since it is less than $0.06 it was originally paying C to route calls.

According to another aspect, the rate generation module 316 may generate an initial rate based on current traffic by the identified wholesale carrier. For example, the rate generation module 316 may analyze the traffic currently used by the identified wholesale carrier and incrementally and/or systematically generate decreased rates to offer the wholesale carrier in an attempt to raise the wholesale carrier's network traffic usage. Once the network traffic by the wholesale carrier beings to rise, the rate generation module 316 may stop generating lowered rates and hold at the current rate. In another aspect, the rate generation module 316 may limit the amount a rate may be decreased based on a profit margin. In particular, the rate generation module 316 may analyze each rate to determine that each rate generated meets a required profit margin, and may not generate any rates that are too low to meet the particular profit margin.

Alternatively, while the various examples above refer to decreasing rates in response to traffic decrease, aspects of the present disclosure may be used to optimize rates in other operating conditions. For example, the rate generation module 316 may analyze the traffic currently used by the wholesale carrier and incrementally and/or systematically generate increased rates to offer the wholesale carrier in an attempt to gain higher profits margins. Such increases may be conducted in the absence of any detected or assumed LCR being conducted by the wholesale carrier. Once a desired profit margin has been reached without causing network traffic to decrease, the rate generation module 316 may stop generating increased rates and hold at the current rate.

The rate generation module 316 may automatically provide the generated rate to the wholesale carrier. Referring to the example above, after generating a rate of $0.51 per call, the rate generation module 316 may provide the rate to carrier B in real-time. For example, the rate generation module 316 may provide the generated rate to the wholesale carrier through a direct data connection, a standard protocol, FTP, HTTP, email, and/or a remote location, such as by a wide area network or via the Internet., etc.

Figure 4:
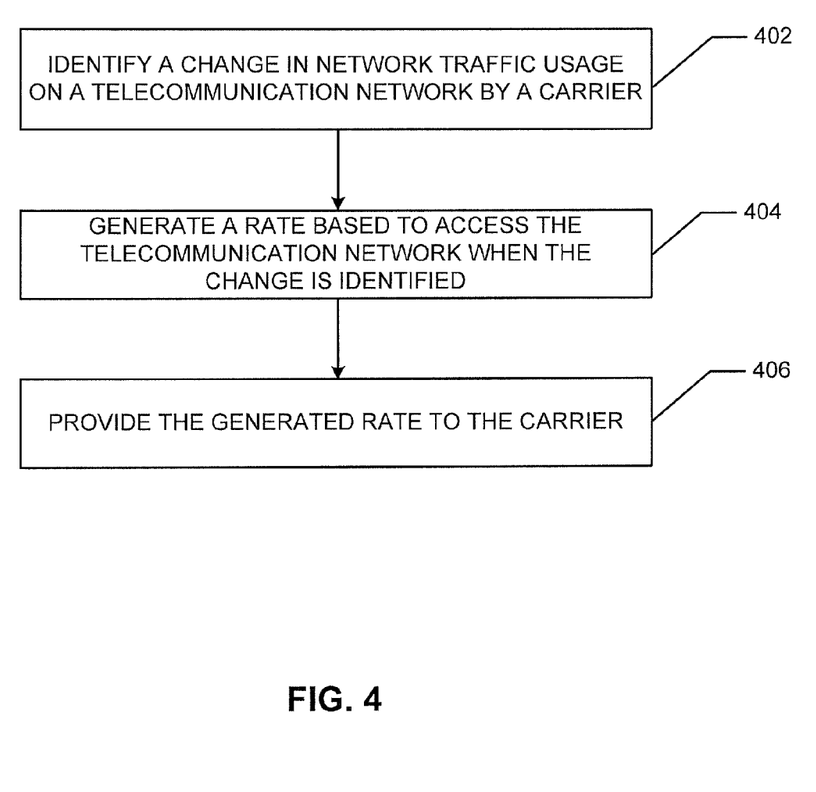
FIG. 4 is a flowchart illustrating an example method for performing least cost routing price management, in accordance with an embodiment of the present disclosure.

FIG. 4 illustrates an example method for performing toll-free reverse LCR and price management. At block 402, the call rate application 204 monitors network traffic for a carrier to identify a change in network traffic on a telecommunications network. In one aspect, the carrier may be wholesale carrier performing LCR. In another aspect, the carrier may be an interexchange carrier, or any type of carrier, performing LCR. The change identified by the processor may be a decrease in network traffic, an increase in network traffic, or some other type of change in network traffic usage by the carrier.

In response to the identified change in network traffic, a new rate for accessing the telecommunication network is generated at block 404. According to one aspect, the new rate may be generated based on routing data comprising a CDR. The CDR may be analyzed to identify a carrier whose network the monitored wholesale carrier is currently using to route toll-free calls. In another aspect, an initial rate may be generated based on the monitored wholesale carrier's network traffic usage and incrementally decreased until the monitored wholesale carrier's network traffic usage increases. Alternatively, if the change in network traffic is an increase in usage, the initial rate may be incrementally increased until network traffic usage by the monitored wholesale carrier beings to stabilize. At 406, the generated rate is provided to the carrier automatically. For example, the generated rate is provided to the carrier over a communication network, such as the internet, in real-time.

Thus, the present disclosure provides methods and systems to telecommunications carriers to monitor lost network traffic due to LCR by other carriers such as wholesale carriers. When changes in network traffic are identified, new, competitive rates may be generated and automatically provided in real-time to the wholesale carriers to cause the network traffic usage by the wholesale carrier to stabilize and/or increase.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for performing reverse least cost routing rate management comprising: identifying, using at least one processor, a change in network traffic usage on a telecommunication network by a specific carrier; and providing, using the at least one processor, a rate for carrying traffic on the telecommunication network when the change is identified, the rate provided to the specific carrier; wherein providing the rate for the
  telecommunication network comprises: initiating, at the at least one processor, a toll-free call when the change is identified; receiving, at the at least one processor, routing data based on the toll-free call, the routing data including a carrier identification and a current rate associated with the carrier identification; and generating, at the at least one processor, the rate based on the carrier identification and the associated current rate.

2. The method of claim 1, wherein the change is a decrease in network traffic usage by the specific carrier and the rate is a decreased rate relative to a previous rate charged to the specific carrier to carry traffic on the telecommunication network.

3. The method of claim 1, further comprising:
  monitoring, at the at least one processor, current network traffic for the specific carrier; and
  incrementally adjusting, at the processor, the rate until the current network traffic stabilizes.

4. The method of claim 1, wherein the rate charged to carry traffic on the telecommunication network is provided automatically.

5. The method of claim 1, wherein the specific carrier is a wholesale carrier.

6. The method of claim 1, wherein the toll-free call is long distance.

7. A system for performing reverse least cost routing rate management comprising:
  at least one processor;
  a memory in operable communication with the at least one processor; and
  a call rate application comprising modules executable by the processor, the modules comprising:
  a networking monitoring module to:
    identify a change in network traffic on a telecommunication network by a carrier; and
  a rate generation module to:
    provide a rate for carrying traffic carry traffic on the telecommunication network when the change is identified, the rate provided to the carrier;

wherein the rate generation module provides the rate changed to carry traffic on the telecommunication network by:
  initiating a toll-free call when the change is identified;
  receive routing data based on the toll-free call, the routing data including a carrier identification and a current rate associated with the first carrier identification; and
  generating the rate based on the first carrier identification and the associated current rate.

8. The system of claim 7, wherein the change is a decrease in network traffic usage and the rate is a decreased rate relative to a previous rate charged to the carrier to carry traffic on the telecommunication network.

9. The system of claim 7, wherein the network monitoring module is further configured to monitor current network traffic for the carrier and the rate generation module is further configured to incrementally adjust the rate until the current network traffic stabilizes.

10. The system of claim 7, wherein the rate generation module is configured to provide the rate charged to carry traffic on the telecommunication network automatically.

11. The system of claim 7, wherein the carrier is a wholesale carrier.

12. The system of claim 7, wherein the toll-free call is long distance.

13. A computer-readable medium encoded with a call rate application comprising modules executable by a processor, the modules comprising:
  a networking monitoring module to:
    identify a change in network traffic usage on a telecommunication network by a carrier; and
  a rate generation module to:
    generate a rate for carrying traffic on the telecommunication network when the change is identified, the rate provided to the carrier;
  wherein the network monitoring module is further configured to monitor current network traffic for the carrier and the rate generation module is further configured to incrementally adjust the rate until the current network traffic stabilizes.

14. The computer-readable medium of claim 13, wherein the change is a decrease in network traffic usage and the rate is a decreased rate relative to a previous rate charged to the carrier to carry traffic on the telecommunication network.

15. The computer-readable medium of claim 13, wherein the rate generation module provides the rate changed to carry traffic on the telecommunication network by:
  initiating a toll-free call when the change is identified;
  receive routing data based on the toll-free telephone call, the routing data including a carrier identification and a current rate associated with the carrier identification; and
  generating the rate based on the first carrier identification and the associated current rate.

16. The computer-readable medium of claim 13, wherein the rate generation module is configured to provide the rate charged to carry traffic on the telecommunication network automatically.

17. The computer-readable medium of claim 13, wherein the carrier is a wholesale carrier.

18. The computer-readable medium of claim 15, wherein the toll-free call is long distance.

* * * * *